United States Patent
Roth (10) Patent No.: US 11,748,582 B2
(45) Date of Patent: *Sep. 5, 2023

(54) INTERFERENCE-REDUCING RFID READER

(71) Applicant: AVERY DENNISON RETAIL INFORMATION SERVICES, LLC, Mentor, OH (US)

(72) Inventor: Mark W. Roth, North Miami, FL (US)

(73) Assignee: Avery Dennison Retail Information Services LLC, Mentor, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/518,032

(22) Filed: Jul. 22, 2019

(65) Prior Publication Data
US 2019/0340397 A1 Nov. 7, 2019

Related U.S. Application Data

(62) Division of application No. 15/353,296, filed on Nov. 16, 2016, now Pat. No. 10,360,418.

(51) Int. Cl.
*G06K 7/10* (2006.01)

(52) U.S. Cl.
CPC ..... *G06K 7/10316* (2013.01); *G06K 7/10009* (2013.01)

(58) Field of Classification Search
CPC .............. G06K 7/10316; G06K 7/10009; H04L 67/12; G06Q 30/0635; H04B 1/1607
USPC ........................................ 340/10.1
See application file for complete search history.

(56) References Cited

U.S. PATENT DOCUMENTS

| 5,595,316 | A | * | 1/1997 | Gallarelli | ............ H05K 7/1425 |
| | | | | | 220/3.7 |
| 7,336,174 | B1 | | 2/2008 | Maloney | |
| 8,770,479 | B1 | | 7/2014 | Shoenfeld | |
| 10,360,418 | B2 | * | 7/2019 | Roth | .................. G06K 7/10316 |
| 2005/0099269 | A1 | | 5/2005 | Diorio et al. | |
| 2008/0237341 | A1 | | 10/2008 | Fleck et al. | |

(Continued)

FOREIGN PATENT DOCUMENTS

| EP | 2600276 | 6/2013 |
| JP | 2009077246 | 4/2009 |

OTHER PUBLICATIONS

International Search Report and Written Opinion of ISA/EPO Prepared for PCT/US2017/061691 dated Feb. 21, 2018.

(Continued)

*Primary Examiner* — Vernal U Brown (57) ABSTRACT

An RFID reader apparatus designed to limit interference in a role of auditing individual RFID tagged or labeled items in areas of surrounding dense RIFD transponder populations. Such an RFID reader apparatus may include an RFID reader, a specialized antenna, and an enclosure, which may be constructed from ferrous material and which may be configured to hold the RFID reader and the specialized antenna in separate compartments. The enclosure may have one or more shelves, which may also be constructed from ferrous material. The RFID reader apparatus may also have a lid constructed from non-ferrous material. The RFID reader apparatus may be fitted to the bottom of an auditing workstation, for example with screws or other connectors, or may be placed within an auditing workstation specifically equipped to accommodate it.

10 Claims, 9 Drawing Sheets

(56) References Cited

U.S. PATENT DOCUMENTS

2015/0236512 A1    8/2015  Whitney
2015/0353292 A1    12/2015 Roth

OTHER PUBLICATIONS

International Preliminary Report on Patentability dated May 31, 2019 issued in corresponding IA No. PCT/US2017/061691 filed Nov. 15, 2017.

* cited by examiner

INTERFERENCE-REDUCING RFID READER

CROSS REFERENCE TO RELATED APPLICATIONS

The present application is a division of, claims priority to, and the benefit of, U.S. utility patent application Ser. No. 15/353,296 filed Nov. 16, 2016, patented on Jul. 23, 2019 as U.S. Pat. No. 10,360,418, which is incorporated herein by reference in its entirety.

BACKGROUND

The use of dynamic radio frequency identification (RFID) scanning tunnel technology allows for high speed bulk reading of the RFID tags belonging to large numbers of objects. Often, such RFID tags are affixed to or integrated into cartons that are used in a manufacturing supply chain, such that the RFID tags can be read by the scanning technology at various touch points throughout the supply chain. Dynamic scanning allows for a much greater efficiency than many other solutions, and offers the capability to process much higher volumes of carton-packed items than many other solutions.

However, one challenge with high speed scanning that must be addressed is how to deal with cartons or other items that are read by the high speed scanning tunnel and which are flagged by the high speed tunnel as exceptions. An "exception" typically means that the carton failed in some manner; for example, a carton might be flagged as an "exception" based on the carton being short on its total expected count of items, or having improper items. Typically, when a carton is flagged as an exception, the carton must be opened up, and each item within the carton must be evaluated to ensure that the carton was properly prepared. This means that, typically, the audit area of a manufacturing facility will include multiple stations that must be constantly attended by auditors equipped to conduct audits of these cartons. Often, it will also mean that items must themselves have individual RFID tags such that the items within a carton can be audited within a reasonable timeframe.

Traditionally, conducting any kind of RFID audit processes in the retail supply chain environment has been extremely challenging. The challenges to conducting a proper audit exist on several levels.

First, in a distribution center environment, there is the potential to have a very high inventory of product, some or all of which may be tagged with RFID transponders at the item level. These large populations of RFID tags can be excited by any nearby RFID reader device emitting an RF field, which may cause inadvertent reading of tags that were not intended to be read during an audit process. For example, in some cases, even the RFID tags of items in other cartons that are moving past an RF field can be energized, causing false reads.

Second, the methods that may be used to read tags during an audit may pose unforeseen hurdles. This may be because of, for example, the infrequency of use of the RFID scanning technology that is used to conduct the audit, which may result in errors owing to workers' unfamiliarity with the devices, or may result in poorly-calibrated scanners escaping detection for some time. The RFID scanning devices used for the audits may also be less sophisticated than RFID devices incorporated into a supply chain or production line, which may result in problems arising from the use of these "lesser designs." This may require, or may motivate, the customer or other operator of these RFID devices to take drastic measures in an attempt to correct the issues.

A typical RFID audit process requires the ability to perform a singulation of an RFID tag or tags. This means that, in a typical audit solution, it is incumbent for the RFID scanning device to have a read field that is only just large enough to interrogate a very small population of tags. This may be, for example, only around 1 to 10 tags, or may be a higher number of tags depending on the process in question. It is also extremely important that the RFID device have a very well-defined target field in which it can read tags. For example, in one case, the target field for an RFID scanning device may only be 12 inches square and emanate roughly 2 inches above the scanning surface.

Such audit processes may often make use of handheld RFID scanning devices. While certain advantages of using handheld devices do exist—for example, a person conducting an audit may be able to narrowly define a target field of the desired size by utilizing a very low-ranged handheld device and moving it throughout the target field—this has generally met with limited success. Likewise, in some cases, audit processes have made use of segregating tags to be scanned into a tightly controlled environment where there is no possibility that errant tags can be read; however, this is often much less convenient than the alternative, and can be disruptive to the supply chain or manufacturing process.

SUMMARY

According to an exemplary embodiment, an RFID reader apparatus designed to limit interference in a role of auditing individual RFID tagged or labeled items in areas of surrounding dense RIFD transponder populations may be shown and described. Such an interference-reducing RFID-reader apparatus may include an enclosure, the enclosure having a backplate and a plurality of sidewalls extending upwards from the perimeter of the backplate, one of the plurality of sidewalls having a reader slot formed therein, each of the plurality of sidewalls further comprising a flange extending outward from the top of the sidewall, each flange having a plurality of connection sites. The enclosure may have, disposed within it, a shelf or inner antenna tray, the inner antenna tray sized to fit within an enclosure cavity defined by the plurality of sidewalls, the disposition of the inner antenna tray in the enclosure cavity defining a cable slot on the plane of the inner antenna tray, the cable slot permitting the passage of a cable from a top side of the inner antenna tray to a bottom side of the inner antenna tray. The interference-reducing RFID-reader apparatus may further include an antenna, the antenna sized to fit within a top enclosure cavity defined by the plurality of sidewalls and the inner antenna tray and disposed on the top side of the inner antenna tray, the antenna configured to broadcast and receive radio-frequency signals. The interference-reducing RFID-reader apparatus may further include an RFID reader sized to fit within the reader slot, the RFID reader comprising a processor and a memory, the memory comprising computer code executable by the processor to cause the RFID reader to communicate with one or more RFID tags in the field of operation of the antenna, capture data belonging to the one or more RFID tags, and interpret the data belonging to the one or more RFID tags, the RFID reader further comprising a data port.

In an exemplary embodiment, the interference-reducing RFID-reader apparatus may be incorporated into an auditing station. Such an auditing station may further include a workstation platform, which may be a working surface constructed from non-ferrous material. The interference-reducing RFID-reader apparatus may be located directly below the working surface and may be positioned such that the antenna is oriented upward.

In a further exemplary embodiment, the workstation may be used as follows. First, a dynamic scanner may detect a carton having an abnormal number of RFID tags, and may divert the carton to an auditing workstation system. A user may then remove one or more items from the carton; scan the one or more items through the read zone of the workstation; detect, with the RFID reader apparatus, a source of the variant number of RFID tags, which may be, for example, a variant number of items or an item having a variant number of RFID tags; and may repack the carton with one or more items, which may include, for example, adding or removing items as necessary.

BRIEF DESCRIPTION OF THE FIGURES

Advantages of embodiments of the present invention will be apparent from the following detailed description of the exemplary embodiments thereof, which description should be considered in conjunction with the accompanying drawings in which like numerals indicate like elements, in which.

DETAILED DESCRIPTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

According to an exemplary embodiment, and referring generally to the Figures, various exemplary implementations of an interference-reducing RFID reader may be disclosed. In an exemplary embodiment, a reader and a specialized antenna may be assembled in a custom fabricated housing. In some embodiments, the resulting assembly may be a complete compact module that could be placed on top of a surface. In other exemplary embodiments, the apparatus may be intended to be mounted to the underside of a workbench/countertop, which may in some exemplary embodiments be formed of non-ferrous material, to create an audit workstation. Such a workbench may have a clean and unimpeded surface upon which an auditor may be able to perform tasks and engage the radio frequency (RF) functionality of the RFID reader as needed.

Such an apparatus may allow RFID workstations to be placed side by side one another, and may even allow RFID workstations to be placed in immediate proximity to large RFID tag populations (such as, for example, next to a supply or production line), while ensuring that none of the extraneous tags of the large RFID tag population are read, and ensuring that only those tags that are placed in the defined read zone of the workstation are read.

According to an exemplary embodiment, the apparatus may include an ultra-thin near-field antenna configured to broadcast a RF signal that is in turn configured to activate and scan RFID tags. The antenna may be nestled within a custom fabricated housing that projects the broadcast RF signal in a tight and controlled manner, which may limit and focus the transmission of the RF signal.

According to another exemplary embodiment, an interference-reducing RFID reader may be installed in or under a work surface, such as a workbench. In an exemplary embodiment, the workbench may be constructed from, or may have a working surface that is constructed from, a non-ferrous countertop material, which may allow the projection of an RF signal therethrough.

Such an apparatus may have numerous advantages as compared to the use of off-the-shelf components, such as the use of an off-the-shelf patch antenna, in order to try to create such an audit tool. For example, according to an exemplary embodiment, an off-the-shelf patch antenna could be mounted under a table and directed upward so as to create a working surface on a countertop above, and optionally an attempt could be made to try to contain the RF field. However, such a solution would have numerous downsides. For example, such a patch antenna would tend to generate side lobes of RF energy that bleed off of the edges of the antenna face, and which can even wrap around the antenna itself, such as around the back plane of the antenna.

Patch antennas are also, generally, designed to radiate a broad RF field, such as an RF field that is as broad as possible. This RF field may be configured to balloon outward to a larger and larger size as more and more power is forced through the patch antenna, which may decrease the extent to which the size and shape of the RF field can be simultaneously controlled. This may heighten the chance that the patch antenna will pick up RFID tags that were not intended to be counted, resulting in inaccurate audits, or resulting in a decreased role of the patch antenna in an auditing function (as an auditor may, for example, be forced to perform additional steps manually, such as a manual count of the items within a container).

However, when power to a patch antenna is decreased, the effectiveness of the design may be decreased. By making an effort to ensure that RFID tags located adjacent to the patch antenna will not be accidentally read, and decreasing the power forced through the patch antenna in order to do so, the ability of the patch antenna to read tags that have been placed on the auditing bench may be reduced as well, again making it difficult to perform the auditing process. In some cases, in an effort to make the field small enough that adjacent tags are not read, the antenna may be made less effective or virtually useless.

However, according to an exemplary embodiment, an interference-reducing RFID reader may better define the field that it projects, allowing several work areas each having an interference-reducing RFID reader installed therein to be placed side-by-side without interference with one another, and without picking up interference or noise from any other objects that may be expected to be nearby, such as shelves of tagged goods that may be awaiting auditing or may have passed auditing, or a supply or production line. This may allow for an RFID audit solution to be rolled out to environments in which high RFID inventory is present but the need for singulation of selected/intended RFID transponders is required, among other exemplary environments.

In another exemplary embodiment, an interference-reducing RFID reader may be employed in a point-of-sale role, and may be integrated into or designed to interface with, for example, a point-of-sale system or point-of-sale station. For example, in an exemplary embodiment, an interference-reducing RFID reader may be mounted under a point-of-sale station, for example as a single apparatus (an "undermountable RFID solution" or UMRS) which may improve the ability of the point-of-sale station to handle RF scanning of retail items while not inadvertently scanning retail items that are not intended to be scanned at the current time (such as, for example, retail items that have been placed on the point-of-sale station by other customers who are waiting to check out).

In some exemplary embodiments, an interference-reducing RFID reader may be configured to work with a dynamic RFID system, and may be configured to employ or facilitate dynamic scanning of application identifiers within that system. In another exemplary embodiment, an interference-reducing RFID reader may be used as a tool to provide or aid in any sort of RFID item scanning.

Figure 1A:
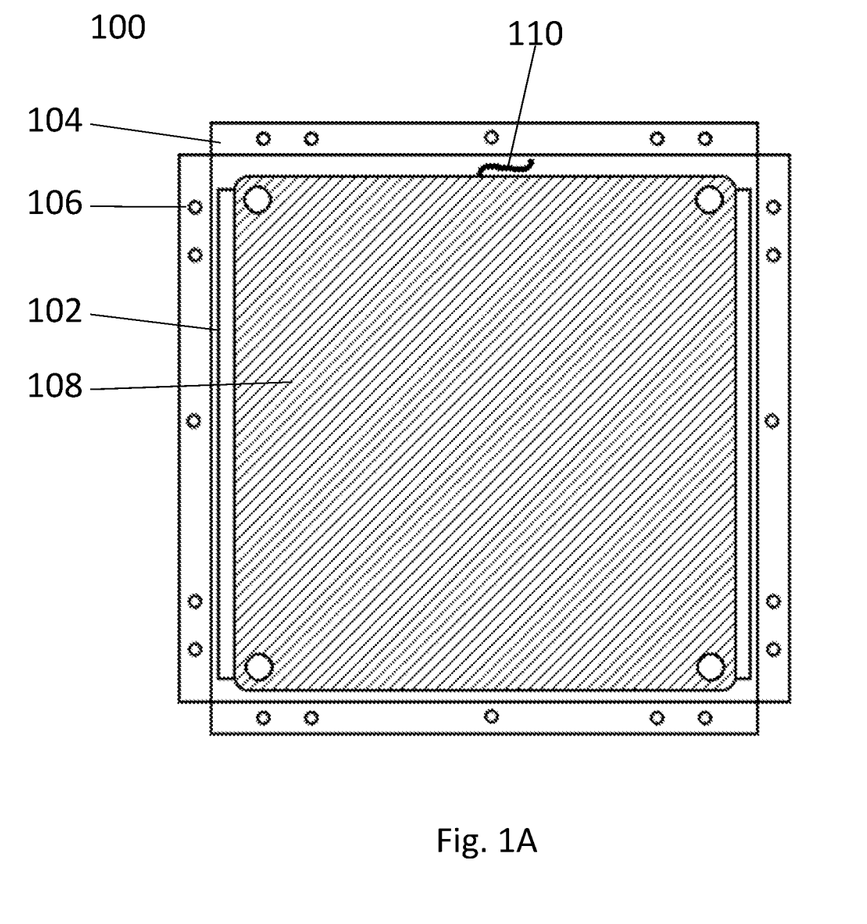
FIG. 1A is an exemplary embodiment of an interference-reducing RFID-reader device.

Turning now to exemplary FIG. 1A, FIG. 1A displays an exemplary embodiment of an interference-reducing RFID-reader device 100. In an exemplary embodiment, the interference-reducing RFID-reader device 100 may be provided in an enclosure 102 configured to be mounted under a workstation or underneath another flat surface. Alternatively, in an exemplary embodiment, the interference-reducing RFID-reader device 100 may be configured to fit within a workstation, such as in a hollow cavity within a workstation, if desired. Such an interference-reducing RFID-reader device 100 may include, for example, an antenna 108 and an enclosure 102 that may be sized to accommodate the antenna 108. In some exemplary embodiments, an interference-reducing RFID-reader device 100 may further include a reader, which may be, for example, mounted under the antenna 108.

According to an exemplary embodiment, such as an exemplary embodiment wherein an interference-reducing RFID-reader device 100 may be configured to fit under and be retrofitted to an existing auditing workstation, the enclosure 102 may have a plurality of flanges 104, which may extend around the perimeter of the enclosure 102 around the top of the enclosure 102. In an exemplary embodiment, flanges 104 may be flat so as to interface with a flat surface above the enclosure, such as the bottom portion of an auditing workstation. In another exemplary embodiment, flanges 104 may have another shape, or combination of shapes, that may serve to interface with a surface that the enclosure 102 is intended to be located below; for example, in an exemplary embodiment, a flange 104 may have a cavity or indentation in order to accommodate a surface geometry feature on the surface. In some exemplary embodiments, flanges 104 may be the extensions of each of the sidewalls of the enclosure 102, and may be formed from, for example, bending the tops of each sidewall of the enclosure 102 so that the sidewall splays outward in the form of a flange 104. In such an exemplary embodiment, the flanges 104 may be spaced apart from one another, for example at the corners of the enclosure 102. In other exemplary embodiments, the flanges 104 may be or may be affixed to a fused piece, for example a square flange, which has no spacing between individual flanges 104.

In an exemplary embodiment, flanges 104 may have a plurality of connection sites 106 in which one or more connectors may be disposed in order to affix the enclosure 102 to an upper surface; for example, in an exemplary embodiment, flanges 104 may have a plurality of screw or nail holes 106 disposed therein. This may allow an enclosure 102 to be attached to the underside of, for example, a wooden auditing station by inserting screws or nails through the holes 106 disposed in the flanges 104.

In other exemplary embodiments, an enclosure 102 may be affixed to an upper surface, such as the lower portion of an auditing station, by another type of connection. For example, in an exemplary embodiment, flanges 104 may be formed from, or may have attached to their upper surface, a material offering good adhesive properties, and the enclosure 102 may be adhesively attached to the upper surface. Alternatively, if desired, adhesive may be attached directly to the top portion of the enclosure 102, such as an enclosure lid, and no flanges 104 may be necessary. Likewise, in some embodiments, a separate retaining structure, such as a plurality of brackets, may be used to hold the enclosure 102 to the upper surface, and no flanges 104 may be necessary. In another embodiment, the enclosure 102 may fit within a cavity in the upper surface, for example fitting within a dedicated cavity in an auditor station formed to retain an interference-reducing RFID-reader device 100, and again no flanges 104 may be necessary. Other configurations of an enclosure, with and without flanges 104, may also be envisioned.

In an exemplary embodiment, the enclosure 102 may be any shape. For example, according to an exemplary embodiment, the enclosure 102 may be square or rectangular. In another exemplary embodiment, the enclosure 102 may be formed so as to be circular or cylindrical in shape, and may have a single flange 104 extending around the perimeter of the top portion of the enclosure 102, or may have a plurality of flanges 104, as desired. Other shapes may also be contemplated.

In an exemplary embodiment, the enclosure 102 may be formed from a ferrous material, such as steel, or may be formed from another material that absorbs RF transmissions. For example, according to an exemplary embodiment, the enclosure 102 may be formed from sheet steel. In some exemplary embodiments, the enclosure 102 may have one or more shelves within the enclosure 102, which may allow the adjustment of the height of the antenna 108 within the enclosure 102; shelves may be securable at a particular height, as desired. In some exemplary embodiments, these shelves may be constructed from the same materials as the remainder of the enclosure 102 (for example, a ferrous material) and may also function as RF absorbers. Alternatively, another material may be used to construct the one or more shelves, as desired. In some embodiments, the antenna 108 may be secured to the one or more shelves, for example by the use of screws, an adhesive such as double-sided tape, or another such connection; in other embodiments, the antenna 108 may be unsecured.

Figure 1B:
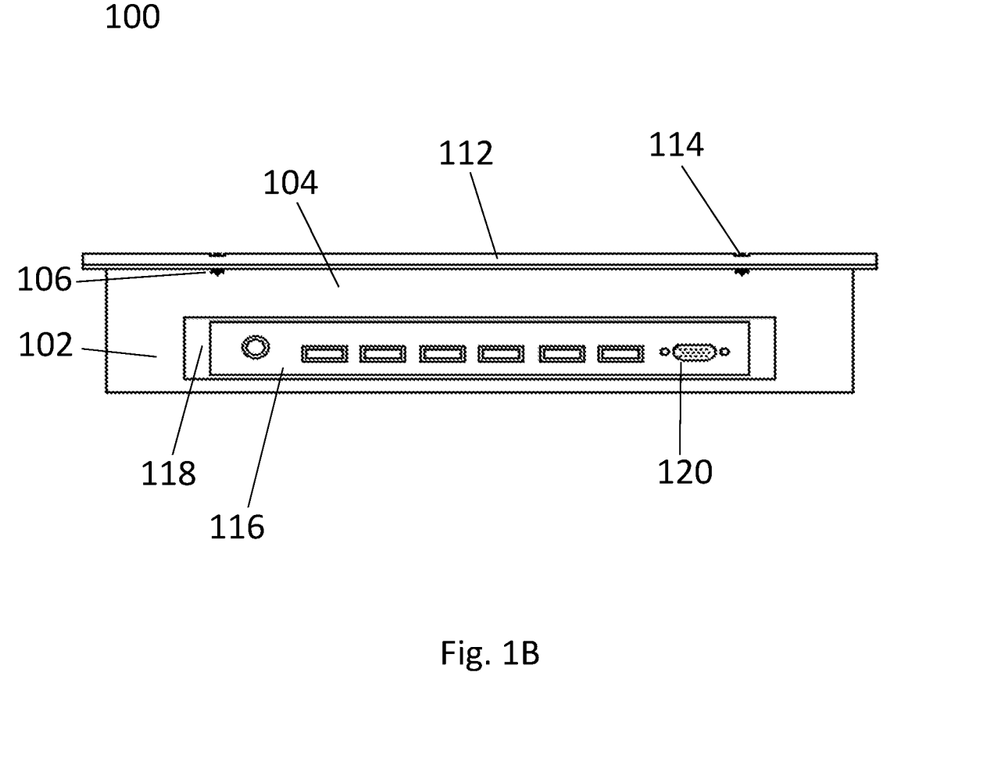
FIG. 1B is an exemplary embodiment of an interference-reducing RFID-reader device.

In some exemplary embodiments, the enclosure 102 may include a lid, which may be placed over the top portion of the enclosure 102. Exemplary FIG. 1B depicts an exemplary embodiment of an interference-reducing RFID-reader device 100 having an enclosure lid 112 attached. In some exemplary embodiments, the lid 112 may be attached to flanges 104; in such embodiments, the enclosure 102 may be attached to an upper surface by the lid 112 or the flanges 104, as desired. For example, in an exemplary embodiment, the lid 112 may be attached to the enclosure 102 by affixing the lid 112 to the flanges 104 at the connection sites 106 disposed within the flanges 104, and the lid 112 may have its own connection sites 114 disposed in the corners of the lid 112 by which the lid 112 may be affixed to an upper surface. In some exemplary embodiments, the lid 112 may be constructed from a non-ferrous and non-RF-blocking material, such as plastic. Such a lid 112 may function to retain the components of the interference-reducing RFID-reader device 100, and may protect some or all of the components of the interference-reducing RFID-reader device 100 from potential sources of harm, such as physical impact damage or water damage.

In some exemplary embodiments, an RFID reader 116 may be housed within the enclosure 102. For example, in an exemplary embodiment, a reader slot 118 may be provided, such as a space under one or more shelves, into which the reader 116 may be placed.

In an exemplary embodiment, the antenna 108 may be connected to an RFID reader 116 by one or more cables 110. In an exemplary embodiment, the enclosure 102 may house the antenna cable 110 in order to protect the antenna cable 110 against disconnection or damage. In some exemplary embodiments, the enclosure 102 may have a separate compartment formed to retain the antenna cable 110 and to ensure that the antenna cable 110 can be easily connected to the reader 116 that may also be housed within the enclosure 102. In other exemplary embodiments, a main compartment of the enclosure 102, which may be, for example, configured to hold the antenna 108, may be slightly oversized so that there is adequate room for the antenna cable 110 to run between the antenna 108 and the reader 116.

In some exemplary embodiments, cable connections 110 may be used for some or all data connections between the antenna 108 and the RFID reader 116, or between either the antenna 108 or the RFID reader 116 and other hardware. In the latter case, in an exemplary embodiment, a reader slot 118 may be positioned such that one or more data ports 120 of the reader 116 may be exposed when the reader 116 is inserted into the reader slot. Alternatively, one or more data ports linking to the data ports 120 of the reader 116 may be provided in the enclosure 102 that may facilitate a connection to other hardware. A cable connection 110 may be a standard connection, such as, for example, an RP TNC or an SMC connection, or may be another type of connection, as may be desired. In another exemplary embodiment, another method of data communication may be used for communications between the antenna 108, the RFID reader 116, and/or another device. For example, in an exemplary embodiment, an Ethernet connection, a wireless connection, a serial connection, or USB communications, or another connection or a combination of connections, may be used. A power supply cable connected to a separate power supply may also be provided, if desired.

In an exemplary embodiment, an interference-reducing RFID-reader device 100 may be constructed to function as a complete stand-alone device or solution, rather than as a sensor intended to be operated by another device. In an exemplary embodiment, the interference-reducing RFID-reader device 100 may, for example, be configured to operate a software platform, and may include a processor and a memory on which the software platform can operate. In an exemplary embodiment, the software platform may be configured to interface with another device, such as another device operated by an auditor at an audit workstation or another such operator, and may provide feedback to the operator. The interference-reducing RFID-reader device 100 may also be configured to compile and output data files using the software platform; for example, in an exemplary embodiment, the interference-reducing RFID-reader device 100 may track, via the software platform, the items that the operator has scanned so that the results compiled by the operator can be compared against other data, if desired.

Turning now to exemplary FIGS. 2A, 2B, 2C, and 2D, FIGS. 2A, 2B, 2C, and 2D each show a component of an exemplary interference-reducing RFID-reader device 100.

Figure 2A:
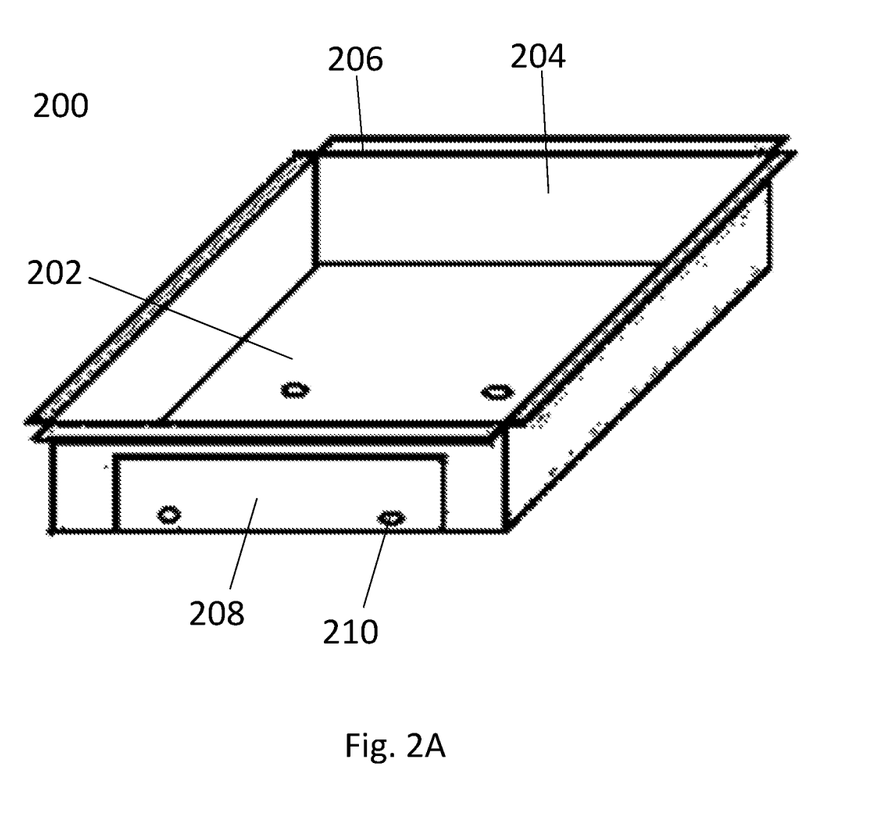
FIG. 2A is an exemplary embodiment of an enclosure.

Turning first to exemplary FIG. 2A, FIG. 2A shows an exemplary embodiment of an enclosure 200. Here enclosure 200 may have a lower surface 202 and one or more walls 204, which may originate from the lower surface and extend vertically or substantially vertically upward. In an exemplary embodiment, some or all of the walls 204 may terminate in flanges 206, which may extend horizontally or substantially horizontally outward from the body of the enclosure 200. In some exemplary embodiments, flanges 206 may be formed from the walls 204; for example, in an exemplary embodiment, the lower surface 202, the walls 204, and the flanges 206 may be constructed from the same piece of sheet metal, which may be bent at the interface between the lower surface 202 and the walls 204 and bent again at the interface between the walls 204 and the flanges 206. In some embodiments, the lower surface 202 may be larger in size than each of the walls 204, and each of the walls 204 may be larger than each of the flanges 206; in other exemplary embodiments, each of the lower surface 202, the walls 204, and the flanges 206 may have different relative sizes.

In an exemplary embodiment, an enclosure 200 may have a reader slot 208 disposed in the outer surface of the enclosure 200, for example in one of the walls 204 of the enclosure 200. Such a slot 208 may allow for an RFID reader to be inserted into the enclosure 200 and accessed once other components of the interference-reducing RFID-reader device 100 are disposed within the enclosure 200.

In an exemplary embodiment, an enclosure 200 may have one or more mounting sites 210. In an exemplary embodiment, an RFID reader may be coupled to the enclosure 200 at the one or more mounting sites 210. In another exemplary embodiment, another component of the interference-reducing RFID-reader device 100, such as a shelf component of the interference-reducing RFID-reader device 100, may be coupled to the enclosure 200 at the one or more mounting sites 210 by one or more connectors; according to an exemplary embodiment, an RFID reader may be framed inside the enclosure by said connectors, preventing the RFID reader from shifting. In another exemplary embodiment, all three of the enclosure 200, the RFID reader, and the shelf component may be coupled together, such as by connectors (such as screws or bolts) that extend through the shelf component and the RFID reader into the mounting sites 210 of the enclosure. Other linkages between the enclosure 200, the RFID reader, and/or a shelf component may be envisioned, as desired.

Figure 2B:
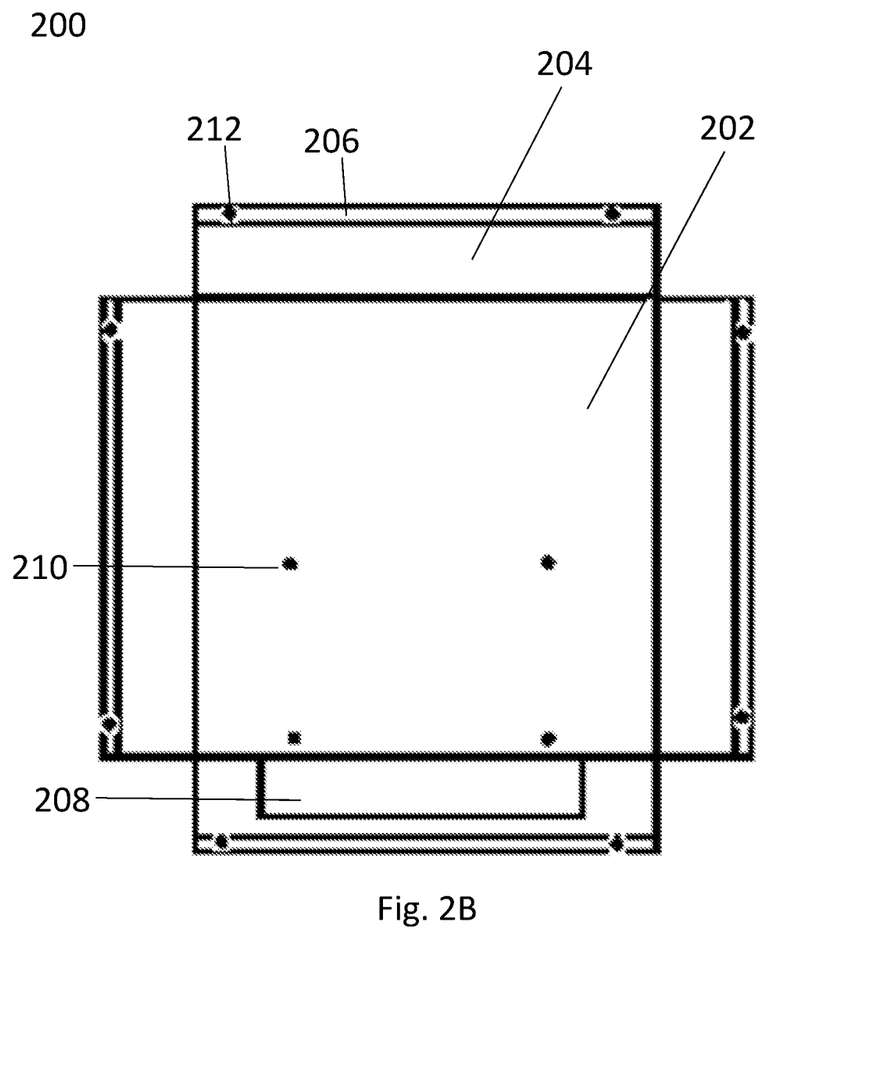
FIG. 2B is an exemplary embodiment of an enclosure.

Turning now to exemplary FIG. 2B, FIG. 2B displays an exemplary embodiment of an enclosure 200 that may be formed from a single piece in its as-yet-unfolded state. In an exemplary embodiment, an enclosure 200 may be formed from a single piece of sheet metal and may be bent at the interfaces between the lower surface 202 and the walls 204, and at the interfaces between the walls 204 and the flanges 206, to form the enclosure 200. In an exemplary embodiment, the flanges 206 of the enclosure 200 may also have a plurality of mounting holes 212 formed therein, which may be used for, for example, mounting of the enclosure 200 to the lower surface of a workstation.

Figure 2C:
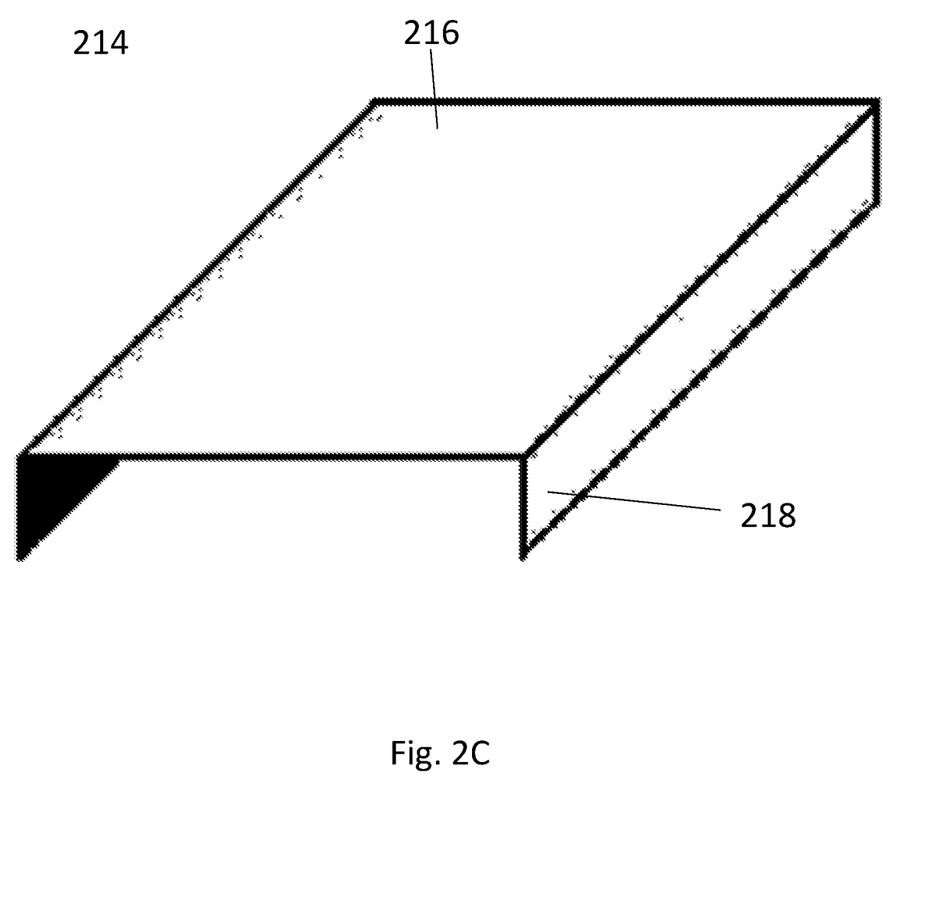
FIG. 2C is an exemplary embodiment of an inner antenna tray.

Turning now to exemplary FIG. 2C, FIG. 2C displays an exemplary embodiment of an inner antenna tray 214. In an exemplary embodiment, an inner antenna tray 214 may have a tray surface 216 and a plurality of tray supports 218, which may extend vertically or substantially vertically downward from a horizontal or substantially horizontal tray surface 216. In an exemplary embodiment, an inner antenna tray 214 may be placed within an enclosure 200 such that the inner antenna tray 214 can fit over an RFID reader device that may be disposed on the lower surface 202 of the enclosure. In some exemplary embodiments, tray surface 216 may be flat; in other exemplary embodiments, one or more portions of the tray surface 216 may be indented or formed in relief, such that an antenna with a large antenna base can lie flat on top of the tray surface 216 by disposing the antenna base within the portions formed in relief. In an exemplary embodiment, the inner antenna tray 214 may be formed to be slightly smaller than the enclosure 200, such that wire may pass between the top portion of the enclosure 200 formed on top of the inner antenna tray 214 and the bottom portion of the enclosure 200 formed below the inner antenna tray 214.

Figure 2D:
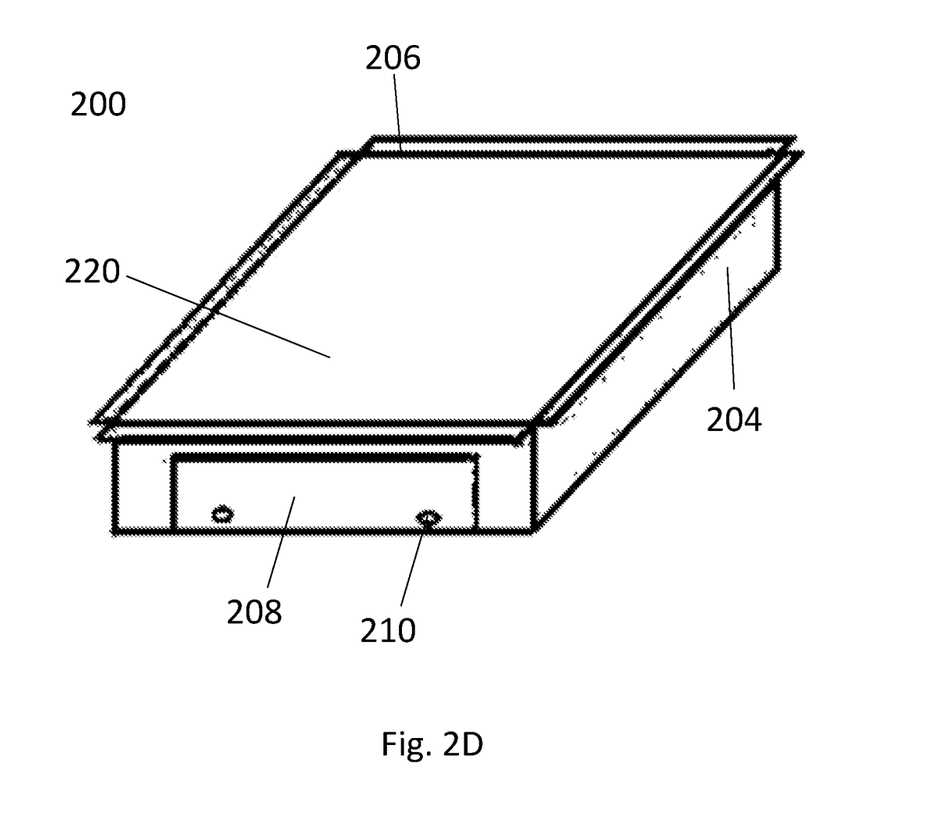
FIG. 2D is an exemplary embodiment of an enclosure having a lid.

Turning now to exemplary FIG. 2D, FIG. 2D displays an exemplary embodiment of an enclosure 200 having a lid 220. In an embodiment, a lid 220 may be fitted to the top portion of the enclosure 200, and may fit over an inner antenna tray 214 while leaving enough room for an antenna to be placed at the top portion of the inner antenna tray 214. In an exemplary embodiment, lid 220 may be constructed from a non-ferrous material.

Figure 3:
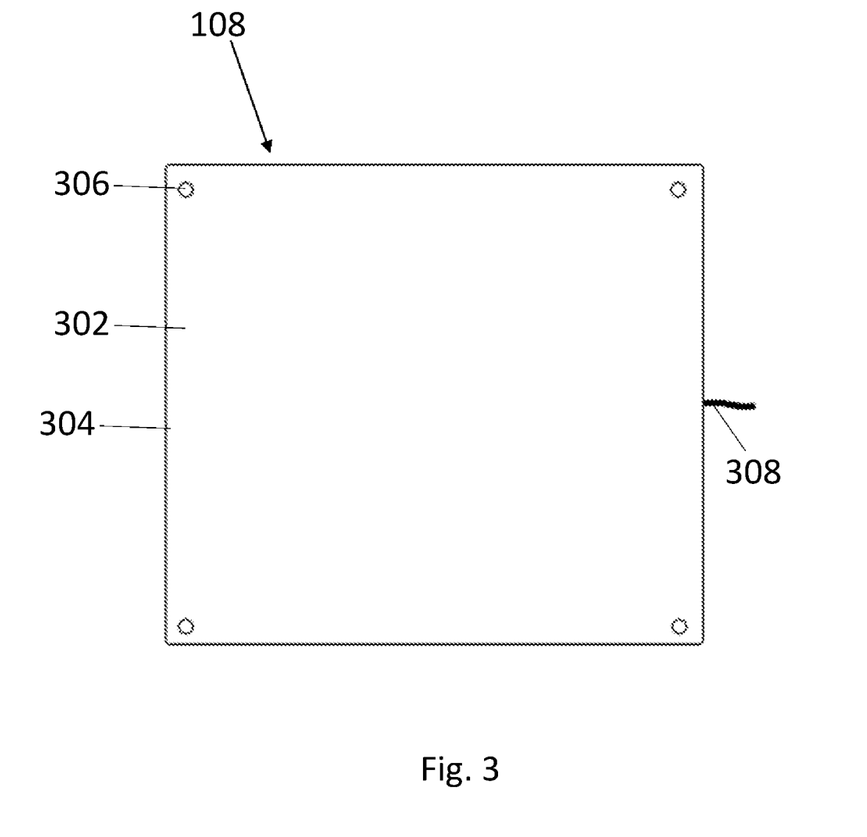
FIG. 3 is an exemplary embodiment of an antenna that may be incorporated into an exemplary embodiment of an interference-reducing RFID-reader device.

Turning now to exemplary FIG. 3, FIG. 3 displays an exemplary embodiment of an antenna 108 that may be incorporated into an exemplary embodiment of an interference-reducing RFID-reader device 100. According to an exemplary embodiment, an antenna 108 may be a near-field UHF RFID antenna 108, having a low far-field gain; for example, in an exemplary embodiment, an antenna 108 with a far-field gain of <−15 dB may be used. An antenna 108 may have a body 302, which may be constructed from a radio-permeable material such as KYDEX or another plastic material, and may have a plurality of mounting sites 306, which may be spaced around the perimeter 304 of the antenna 108. An antenna 108 may also have one or more cables for data transmission 308 leading from it, which may be connected to another part of an interference-reducing RFID-reader device 100 by a standard connector, such as an SMA connector or another such connector, as may be desired. In an exemplary embodiment, an antenna 108 may have a thin profile, and may be, for example, mere millimeters thick. In an exemplary embodiment, a center portion of the body 302 of the antenna 108 may be fitted with adhesive in order to better hold the antenna 108 in place in the interference-reducing RFID-reader device 108. An antenna 108 may operate in a frequency range appropriate to read an RFID tag; for example, in one exemplary embodiment, an antenna 108 may operate in the 902 to 928 MHz range (in order to comply with a standard set by the FCC), and in another exemplary embodiment, an antenna 108 may operate in the 865 to 867 MHz range (in order to comply with a standard set by the ETSI). Antennas 108 targeting other frequency ranges may also be understood and may be used as desired.

Figure 4:
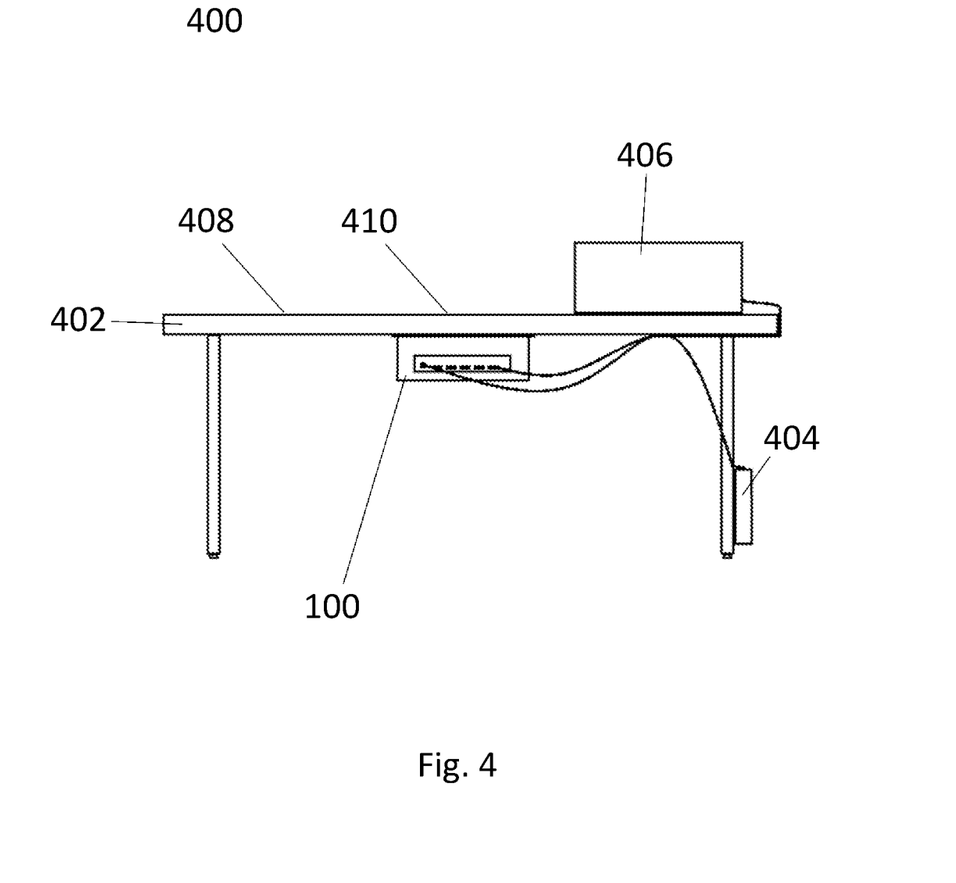
FIG. 4 is an exemplary embodiment of an audit station incorporating an undermounted enclosure.

Turning now to exemplary FIG. 4, FIG. 4 displays an exemplary embodiment of an auditing station 400 incorporating an interference-reducing RFID-reader device 100. In an exemplary embodiment, an auditing station 400 may be formed around a workstation 402, which may have a non-ferrous upper surface and open space beneath the surface in which an interference-reducing RFID-reader device 100 may be mounted. For example, according to an exemplary embodiment, a workstation 402 may be a folding table having a non-ferrous countertop; alternative orientations of workstation 402 may also be utilized or otherwise understood.

In an exemplary embodiment, an interference-reducing RFID-reader device 100 may be mounted to an underside surface of the workstation 402, for example with screws, bolts, or other connectors, or another method of mounting. For example, in an embodiment, the enclosure of the interference-reducing RFID-reader device 100, which may be an enclosure 200, may have one or more flanges 206 at the upper portion of the enclosure 200 by which the interference-reducing RFID-reader device 100 can be mounted to the underside surface. For example, in an exemplary embodiment, a plurality of screws may be disposed through the flanges 206 and into the underside surface of the workstation 402.

In an exemplary embodiment, an auditing station 400 may also include a power supply 404 by which an interference-reducing RFID-reader device 100 may be powered. This may be, for example, a self-contained power supply that may allow the auditing station to be easily moved to various points on a production line, or may be a connection to an external power source, such as a wall outlet.

In an exemplary embodiment, an auditing station 400 may also include a user console 406. In an exemplary embodiment, a user console 406 may include, for example, a user interface having a connection to an interference-reducing RFID-reader device 100 and through which the interference-reducing RFID-reader device 100 can be controlled. In an embodiment, this may be, for example, a touch-screen interface. In some embodiments, this may provide the user of the auditing workstation 400 with valuable visible feedback regarding the operation of the interference-reducing RFID-reader device 100, which may allow the user to compare what was expected to be detected by the interference-reducing RFID-reader device 100 and what was actually observed.

In another exemplary embodiment, a user console 406 may further include an RFID printer. This may allow a user of the auditing station 400 to take corrective action to generate and apply a new (i.e. corrected) label or tag to an item found to be in error, for example items with defective tags.

A read zone 410 may be created by the interference-reducing RFID-reader device 100, in which items may be scanned for the presence of an RFID tag, evaluated to determine if the correct tag has been applied or not applied, and manually evaluated (for example, visually or physically inspected for accuracy of particular traits that the item should have, such as color, kind, and size) to the extent that that is necessary.

According to an exemplary embodiment, in order to use the auditing station 400, a user may first unpack a carton by unloading the contents onto the upper surface of the workstation 402, for example at a free end of the upper surface 408 not associated with the interference-reducing RFID-reader device 100.

The user may then slide items, item by item, across the read zone 410 created by the interference-reducing RFID-reader device 100, and may also be manually inspected as necessary. After scanning and, if desired, manual inspection, these items may be repackaged into the carton in the event that they are found to be correct. However, should the item be found to be incorrect, the user may be alerted by the output of the user console 406, and the user may be able to take corrective action directly focused on the specific item that was found to be incorrect before repacking the carton.

In an embodiment, an auditing station 400 may be paired with other elements of a quality assurance process in order to maximize the efficiency of the quality assurance process. For example, in an exemplary embodiment, it may be undesirable for an auditor making use of the auditing station 400 to personally inspect every carton. In such an embodiment, the auditing station 400 may be downstream of one or more inspection devices on a supply or production line, which may be configured to automatically flag suspect cartons or suspect items to be audited at an auditing station 400.

For example, according to an exemplary embodiment, a supply chain line may incorporate a dynamic scanning tunnel (DST) and/or a high-density read chamber (HDRC). In an embodiment, a DST may reside on a continuously-flowing conveyor line, such that every carton that is carried by the conveyor line passes through the DST. The DST may internally project a tightly-controlled RF field, which may be used for interrogation of said cartons. Cartons may be passed through the DST at a high speed, and the DST may perform carton reads on each carton, combining the data collected of the Carton ID with data on the total carton count and the itemization of each individual carton.

In another embodiment, a HDRC may be provided, which may operate instead of or in addition to a DST. (For example, in an exemplary embodiment, cartons that have been flagged by the DST may be diverted to the HDRC.) In an embodiment, cartons may be encapsulated in the HRDC, and may be subjected to static state tests, whereby the RF signal can be set to a higher level of regulated power, and whereby the signal will be contained on all sides instead of just by the walls of the DST. According to an exemplary embodiment, using the reflectance of the signal on the interior surfaces of the chamber, the RF energy may be broadcast internally to the chamber in such a manner that the RF energy strikes individual RFID inlays contained within the carton from all possible angles. Unlike the DST, the HDRC may be used to effectively bathe cartons in an RF field for an extended period of time, rather than merely passing them through an RF field for a fraction of a second. The HDRC may thus have certain advantages over the DST in terms of accuracy; because the RF field is contained within the chamber, inventory that is tagged with RFID transponders may have no bearing or impact on the evaluation of a carton being interrogated within the HDRC. The HDRC may also be used in circumstances where there is inventory that is adjacent to or in close proximity to the HDRC; for example, cartons may be stacked at the end of a supply line for inspection by the HDRC, and the HDRC may be used without potential interference from the stacked cartons.

In an embodiment, whether a DST, HDRC, or a combination of the two is employed to scan a carton, upon the result of the carton scan indicating some mismatch, the carton may be diverted to an auditing station 400. For example, in an embodiment, a dynamic scan of a carton may indicate that the item count of a carton is too high or too low, which may indicate that the carton is in a shortage or over-pack situation. Once the scan detects that the item count is too high or too low, a downstream divert may take place, and the carton may be re-routed off of the supply or production line for further analysis. A user may then determine whether the carton has a shortage of items, whether the carton has the proper number of items but a shortage of RFID tags indicating the presence of items, whether the carton has a surplus of items, or whether the carton has the proper number of items but a surplus of RFID tags indicating the presence of items, and may then take steps to remedy whatever deficiency there is.

Figure 5:
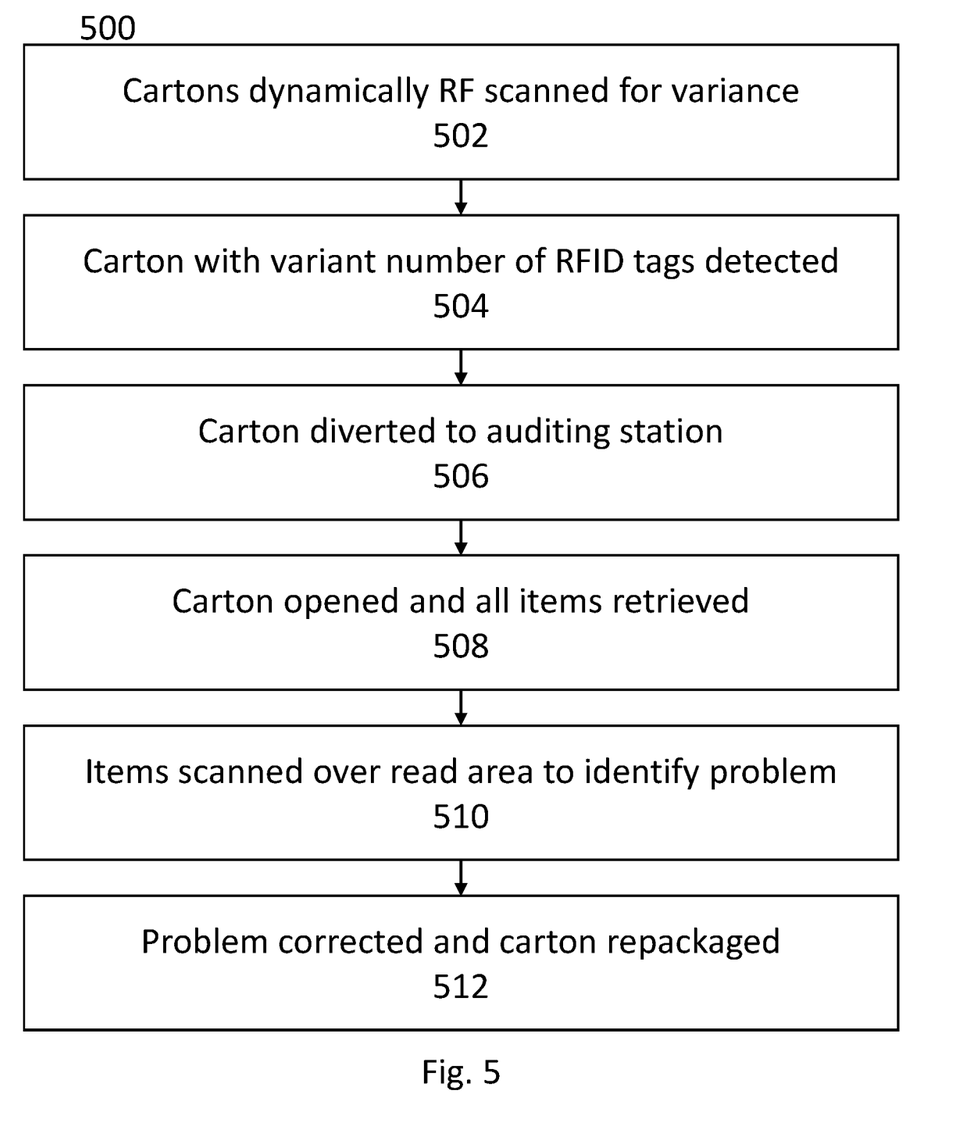
FIG. 5 is an exemplary diagram showing a flowchart of a scanning process.

Turning now to exemplary FIG. 5, FIG. 5 displays a flowchart detailing a potential embodiment of the process outlined above. Cartons may be dynamically scanned for variance 502, such as with a DST or HDRC. When a carton with a variant number of RFID tags is detected 504, or some other anomaly is detected with the carton, the carton may be diverted 506 to an auditing station 400. An auditor at the auditing station 400 may then open the carton 508, remove all items, and scan each of the items 510 over an interference-reducing RFID-reader device 100 disposed under the surface of the auditing station 400. Once the source of the problem is discovered, the auditor may correct the problem and repackage the carton 512.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art (for example, features associated with certain configurations of the invention may instead be associated with any other configurations of the invention, as desired).

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. An auditing workstation system for auditing RFID tagged items, comprising:
    one or both of a dynamic scanning tunnel and a high density read chamber, each being configured to detect an anomaly related to items within a carton to enable flagging of an anomalous carton;
    an auditing RFID reader apparatus disposed downstream of the one or both of the dynamic scanning tunnel and the high density read chamber for receiving the anomalous carton, the RFID reader apparatus comprising:
        an enclosure, the enclosure having a backplate and a plurality of sidewalls extending upwards from a perimeter of the backplate, one of the plurality of sidewalls having a reader slot formed therein;
        an inner antenna tray, the inner antenna tray sized to fit within an enclosure cavity defined by the plurality of sidewalls, the disposition of the inner antenna tray in the enclosure cavity defining a cable slot on a plane of the inner antenna tray, the cable slot permitting the passage of a cable from a top side of the inner antenna tray to a bottom side of the inner antenna tray;
        an antenna, the antenna sized to fit within a top enclosure cavity defined by the plurality of sidewalls and the inner antenna tray and disposed on the top side of the inner antenna tray, the antenna configured to broadcast and receive radio-frequency signals; and
        an RFID reader sized to fit within the reader slot, the RFID reader comprising a processor and a memory, the memory comprising computer code executable by the processor to cause the RFID reader to communicate with one or more RFID tags in a field of operation of the antenna, capture data belonging to the one or more RFID tags, and interpret the data belonging to the one or more RFID tags, the RFID reader further comprising a data port; and
    a workstation platform, the workstation platform comprising a working surface constructed from non-ferrous material;
    wherein the RFID reader apparatus is located at a position below the working surface and is positioned such that the antenna is oriented upward.

2. The auditing workstation system for auditing RFID tagged items of claim 1, wherein each of the plurality of sidewalls of the RFID reader apparatus further comprises a flange extending outward from the sidewall, each flange having a plurality of connection sites; and
    wherein the RFID reader apparatus is secured to the workstation platform by connectors disposed in the plurality of connection sites.

3. The auditing workstation system for auditing RFID tagged items of claim 1, wherein the RFID reader apparatus is disposed within a hollow cavity within the workstation platform.

4. The auditing workstation system for auditing RFID tagged items of claim 1, wherein the RFID reader apparatus further comprises a lid formed from non-ferrous material, the lid being sized to fit within an opening in the enclosure defined by the plurality of sidewalls.

5. The auditing workstation system for auditing RFID tagged items of claim 1, wherein the enclosure and the inner antenna tray of the RFID reader apparatus are each formed from ferrous material.

6. The auditing workstation system for auditing RFID tagged items of claim 5, wherein the enclosure is formed from a single piece of sheet metal.

7. The auditing workstation system for auditing RFID tagged items of claim 1, wherein the inner antenna tray of the RFID reader apparatus further comprises a recessed portion adapted to hold the antenna.

8. The auditing workstation system for auditing RFID tagged items of claim 1, further comprising an external power supply configured to be coupled to a power supply port disposed on the RFID reader.

9. The auditing workstation system for auditing RFID tagged items of claim 1, further comprising a user console, the user console comprising a user interface and an RFID printer.

10. The auditing workstation system for auditing RFID tagged items of claim 1, wherein the antenna of the RFID reader apparatus is a near-field UHF antenna.

* * * * *